Figure 6:
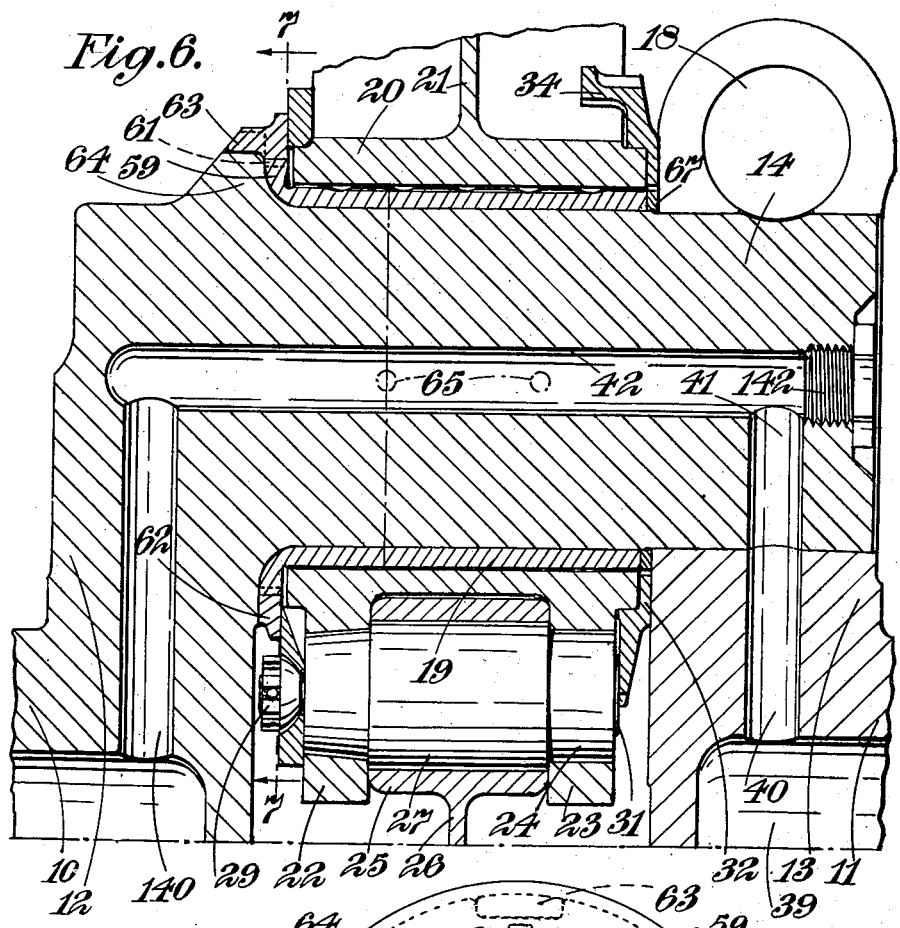

Dec. 30, 1941.  A. H. R. FEDDEN  2,267,859
JOURNAL BEARING
Filed April 22, 1940    5 Sheets-Sheet 1
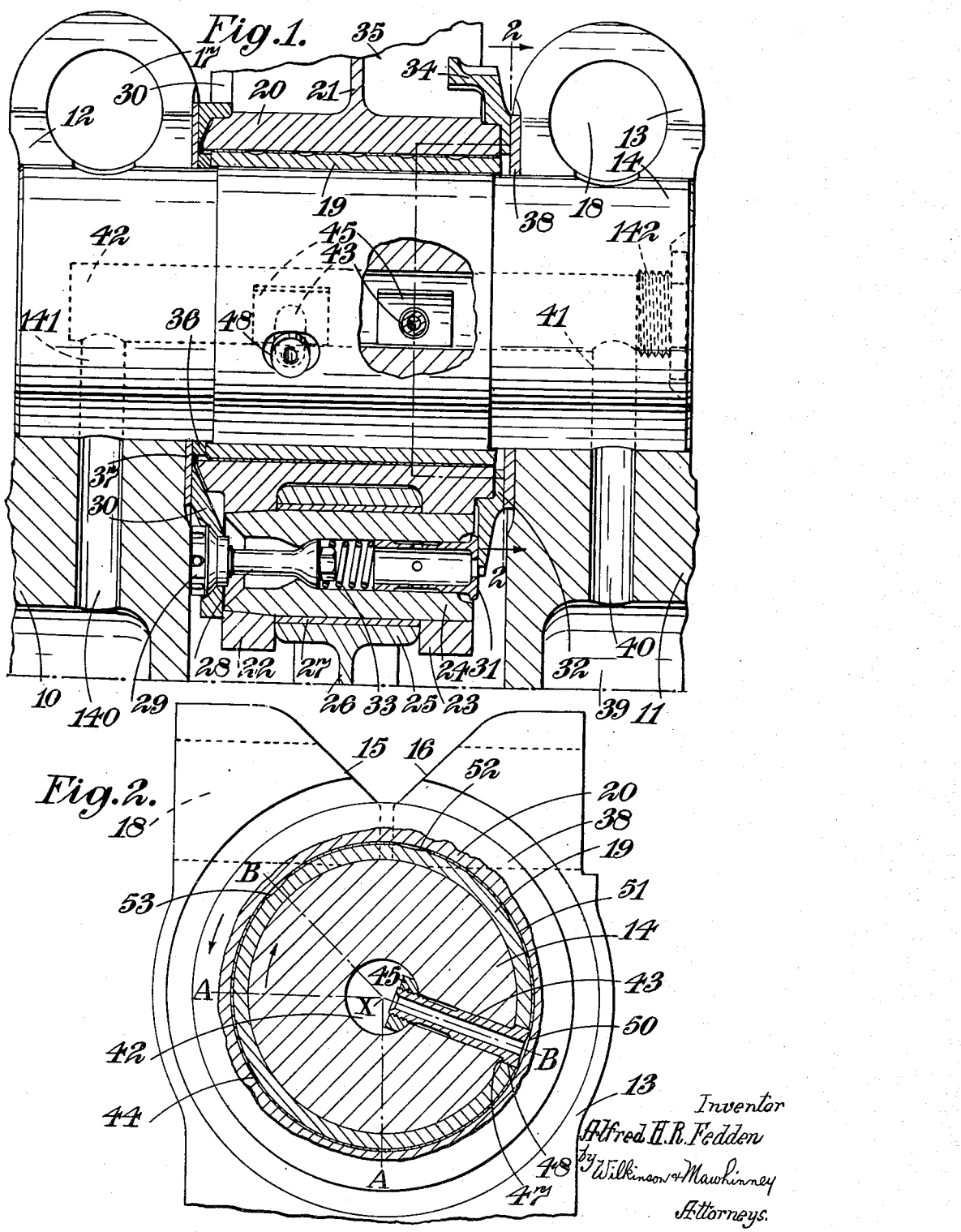
Inventor
Alfred H. R. Fedden
by Wilkinson & Mawhinney
Attorneys.

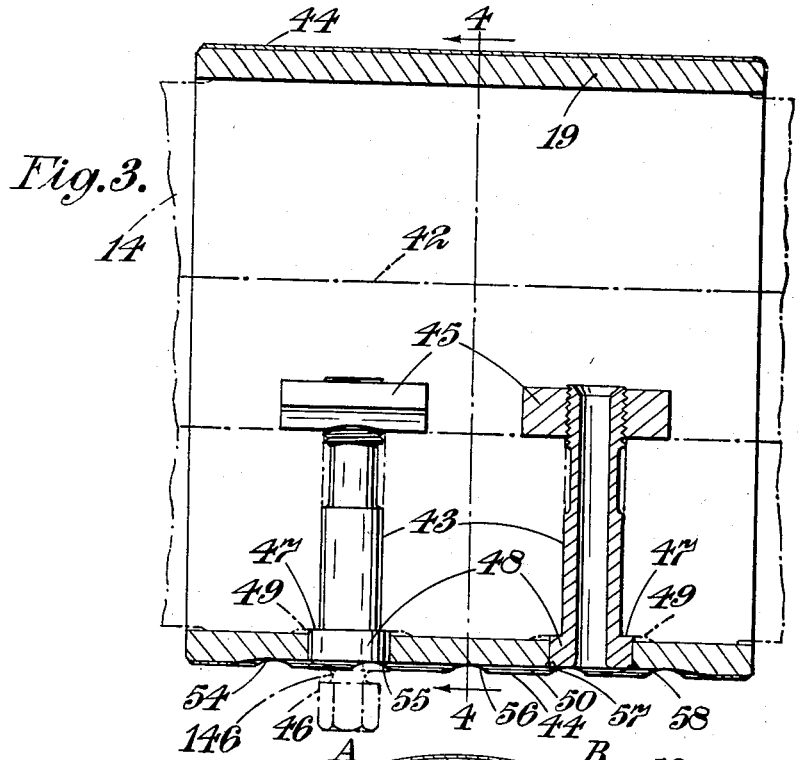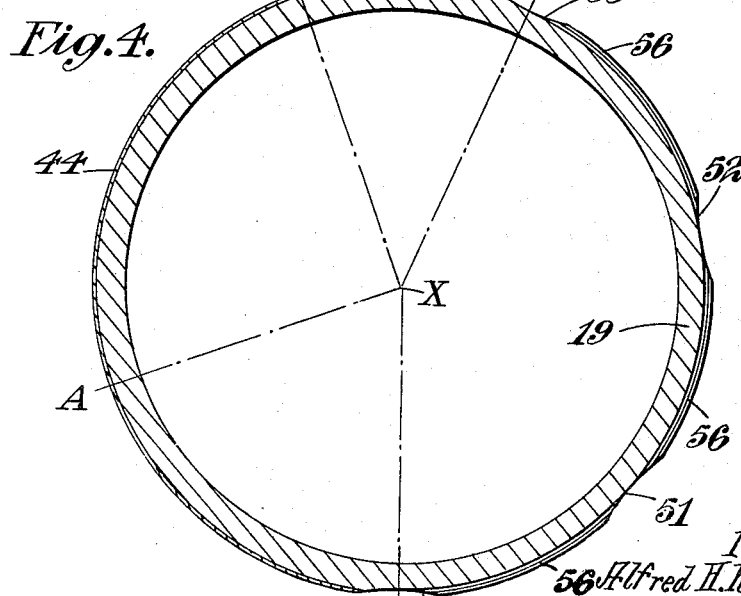

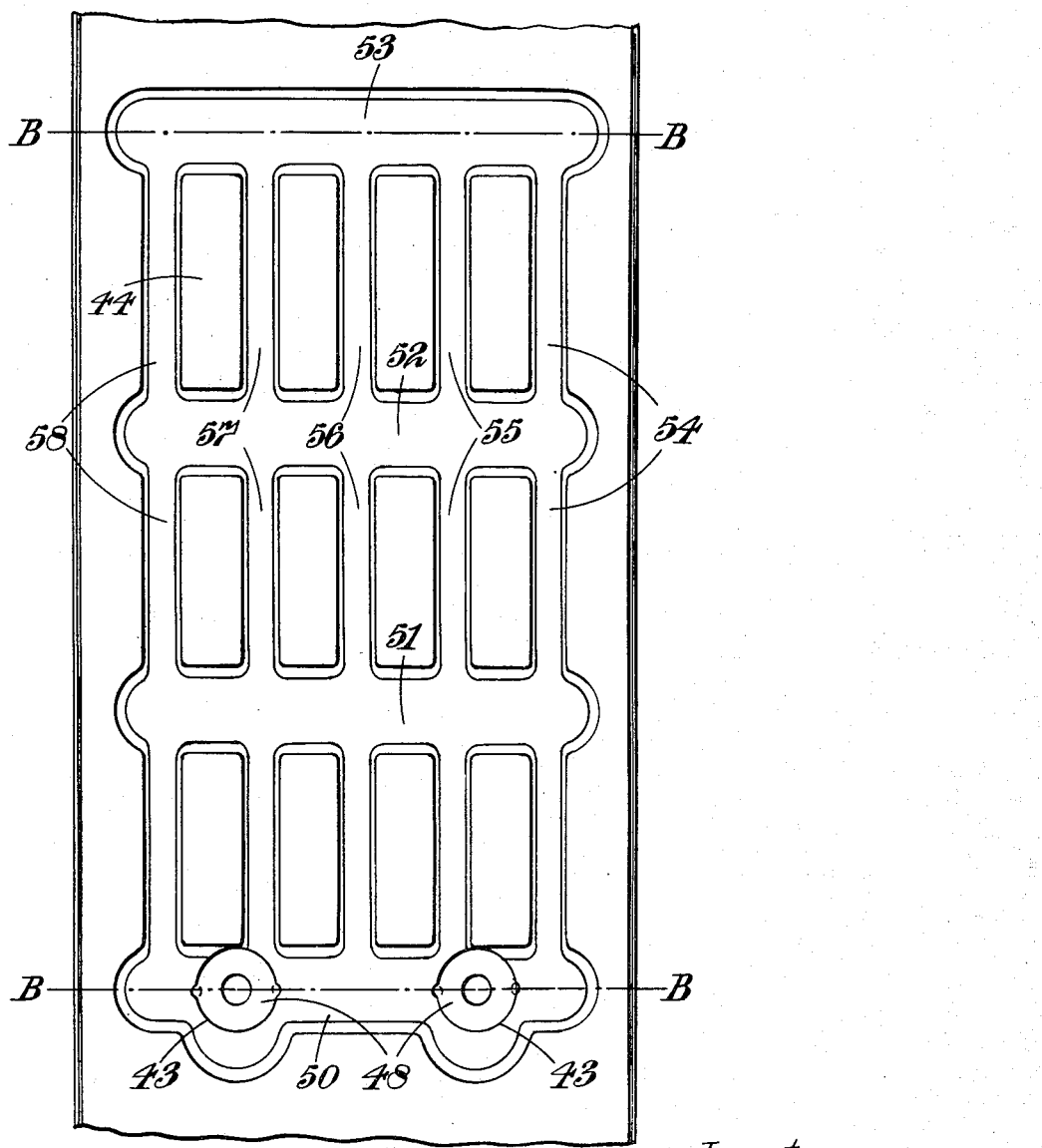

Dec. 30, 1941.     A. H. R. FEDDEN     2,267,859
JOURNAL BEARING
Filed April 22, 1940     5 Sheets-Sheet 4

Inventor
Alfred H.R.Fedden
by Wilkinson & Mawhinney
Attorneys.

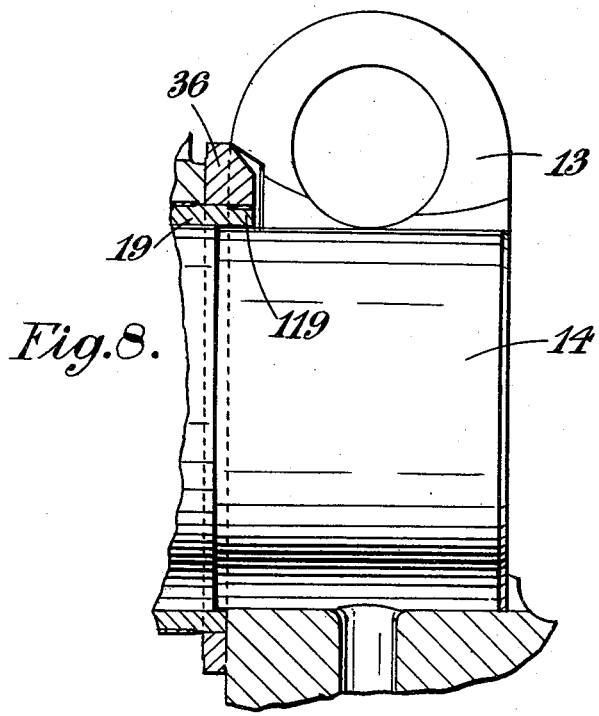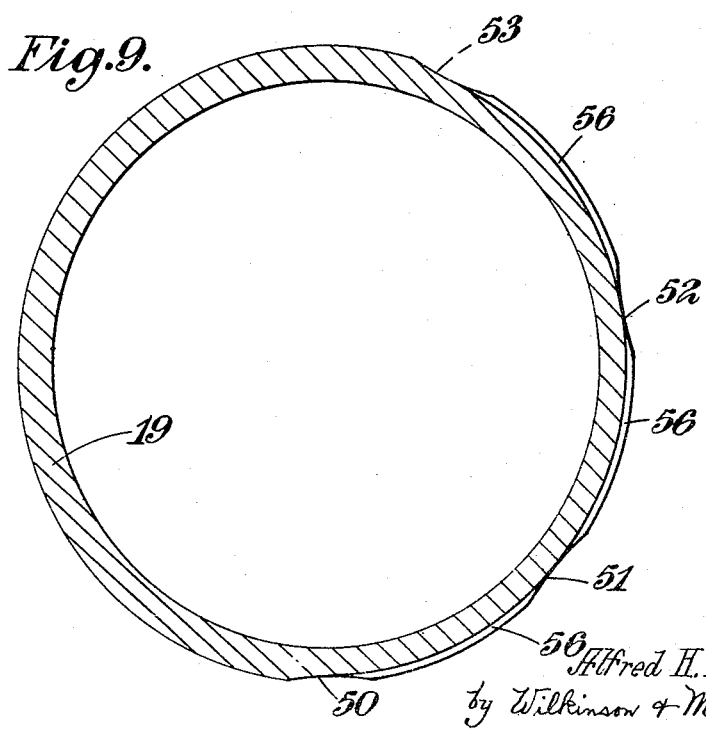

Patented Dec. 30, 1941

2,267,859

UNITED STATES PATENT OFFICE 2,267,859

JOURNAL BEARING

Alfred Hubert Roy Fedden, Bristol, England, assignor to The Bristol Aeroplane Company Limited, Bristol, England, a British company Application April 22, 1940, Serial No. 331,028
In Great Britain April 28, 1939

8 Claims. (Cl. 308—122)

This invention relates to journal-bearings such as the big-end and crank-shaft bearings of internal-combustion engines.

The load on the surface of an internal-combustion engine crank-pin tends to be concentrated always upon the same part, only, of its circumference (herein termed the "pressure-sector"), the remainder of the surface, and especially the sector diametrically opposite the pressure-sector, being substantially free from load. For example, in a radial-cylinder engine in which the crank-pin is encircled by a master big-end to which the other connecting rods are articulated, the pressure-sector extends approximately over the quadrant extending from the point nearest the crank-shaft axis in the direction in which the crank-pin rotates with respect to the big-end. The remainder of the crank-pin surface is substantially entirely free from load when the engine is running. Similarly, the journals of the crank-shaft, in the case of a radial engine, are subjected to a pressure-peak which rotates at the same speed as the shaft and is therefore exerted always upon the same sector of the journal.

One object of this invention is to improve the performance of journal-bearings of the kind in which the journal has a pressure-sector as above described; a further object is to provide an improved construction of journal-bearing of more general application.

According to the invention, a journal-bearing, of the kind which has a pressure-sector, comprises a bush, of which at least an outer layer is of bearing metal, fixed to the journal and formed with an external depression at a point in its circumference other than within the pressure-sector, and means for supplying lubricant to such depression. A method of supplying the lubricant preferably consists in supplying it at a greater rate than would be required merely for the purposes of lubrication, whereby the lubricant also acts as a coolant.

According to another feature of the invention, a big-end bearing for a radial-cylinder internal-combustion engine comprises a unitary bush, of which at least an outer layer is of bearing metal, engaging the crank-pin by an interference fit, with or without a dowel or other additional locating means. The expression "unitary" is used in contradistinction to the type of bearing bush comprising two or more parts which are assembled around the crank-pin or other journal and it will be understood that a unitary bush can be used only where the crank-pin or other journal is of the kind which permits the passage of a unitary bush into position endwise along it.

Where a dowel is used as an additional fastening between the journal and bush the said dowel, according to the invention, may be a tube extending from the hollow interior of the journal to a point in the surface of the bearing metal other than within the pressure-sector, whereby lubricant can be supplied to the bearing surface from the interior of the journal through said tube. A feature of the invention also consists in a method, hereinafter described, of assembling the journal-bearing.

In an alternative form of the invention the bush may be additionally locked by being formed with a castellated or splined flange which engages non-rotatably with a crank-web; or the bush may be formed with a single lug to engage the crank-web in a manner described below.

Other features of the invention will appear hereinafter.

Specific embodiments of the invention will now be described, by way of example, with reference to the accompanying drawings, in which—

Figure 7:
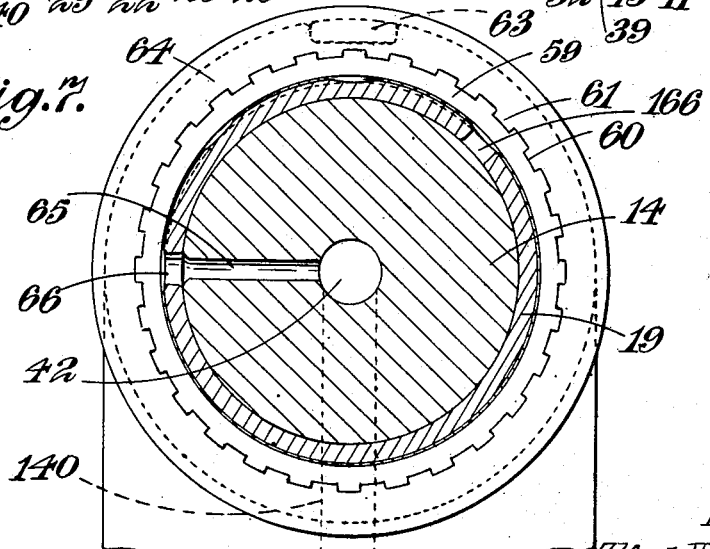

Figure 1 is a section through the big-end bearing of a radial-cylinder internal-combustion engine, Figure 2 being a section on the line 2—2, Figure 3 is a section, to an enlarged scale, of the fixed bearing bush, Figure 4 being a section on the line 4—4 of Figure 3, Figure 5 is a developed face view of part of the surface of the bearing bush shown in Figures 3 and 4, Figures 6 and 7 are sections, corresponding to Figures 1 and 2, respectively, of an alternative arrangement according to the invention, Figure 7 being a section on the line 7—7 of Figure 6, Figure 8 is a section of an alternative means for locking the bush against rotation with respect to the journal, and Figure 9 is a sectional view of an alternative form of bush according to the invention.

As shown first in Figures 1 and 2, the crank-shaft of the engine comprises two shaft-portions 10, 11, each integrally formed with a crank-web portion 12, 13, respectively, the crank-webs being each bored to receive a crank-pin 14 and each split to form two horns (the horns 15 and 16 of the web 13 being shown in Figure 2) which are drawn together by bolts (not shown) passing through suitable holes 17 and 18 in the horns to clamp the crank-pin 14 to the webs.

Between the two crank-webs the crank-pin 14 is engaged by a steel shell 19 the outer surface of which is coated with bearing metal to constitute a bearing bush, the bush being more fully described below with reference to Figures 3, 4 and 5. The bush is externally engaged by the steel boss 20 of the master connecting-rod 21. In known manner, this connecting-rod is formed with flanges 22 and 23 to support the wrist-pins (one of which, 24, is shown in Figure 1) which are engaged by the inner ends of the auxiliary connecting-rods. The boss 25 of one such connecting-rod 26 is shown in Figure 1, the boss being separated from the steel wrist-pin 24 by a bush 27 of bearing metal.

Each wrist-pin is held in place by a bolt 28 which is engaged by a nut 29 which is received in a recess in a locking-plate 30 surrounding the crank-pin. At the other end of the hollow interior of the wrist-pin a perforated tube 31 engages an oil-sealing plate 32, being pressed towards the right by a compression spring 33. The plate 32 is locked against rotation relatively to the master-rod boss 20 by projections 34 which embrace the web-portion 35 of the master-rod. The escape of oil from the left-hand end of the crank-pin bearing is prevented by a ring 36, plate 37, and locking-plate 30. A plate 38, similar to the plate 37, engages the outer face of the sealing-plate 32. As will be explained below, the shell 19 is fixed to the crank-pin so as to rotate therewith. The boss 20 of the master connecting-rod 21 is unlined so that the rubbing takes place between the layer of bearing metal on the outer surface of the shell 19 and the inner bore of the boss 20. These surfaces are lubricated by oil which is pumped along the hollow interior 39 of the crank-shaft 11, through a radial conduit 40 in the crank-web 13 and a radial conduit 41 in the crank-pin to a central concentric conduit 42 in the crank-pin which is closed by a plug 142. The oil flows from the central conduit 42 to the front of the crank-shaft through radial conduits 141, 140. As shown in Figure 2, a tube 43 leads from the conduit 42 to the external surface of the shell 19. Oil from this surface is discharged at the left-hand of the bearing to lubricate the wrist-pins in known manner.

As shown in Figures 3, 4 and 5, the steel shell 19 carries a thin external layer 44 of bearing metal which is fastened to it by being welded to it or fused to it, or by rolling, electro-deposition, chemical deposition or other means so that the shell and bearing metal are inseparably united to constitute what is herein termed a bearing bush. Prior to the assembly of the crank-shaft the internal bore of the shell 19 is of smaller diameter than the external dimension of the crank-pin 14. For example, where the crank-pin is about 2¾" in diameter, the difference in diameter between the shell and crank-pin may be between .003 and .004 inch. In order to assemble the parts, the crank-pin is cooled to a low temperature and the bush is heated so that the bush can be slid on to the crank-pin. Alternatively, the necessary temperature difference may be attained merely by heating the bush. In order to avoid fretting between the two engaging surfaces the inner surface of the shell 19 may be previously coated with a thin layer of soft metal such as silver, for example, by being electro-plated with silver.

It is found that the interference fit between the bearing bush and the crank-pin cannot be relied on to prevent creep between the two parts. The bush is therefore located by other means as will now be described. As shown in Figures 1 to 5, the shell and crank-pin are drilled with a radial hole which enters the central oil-conduit 42. The hole is now engaged by a tubular bolt 43 the inner end of which is screw-threaded to engage a nut 45 (Figures 1 and 2) the outer surface of which conforms to the cylindrical shape of the bore 42 so as to be non-rotatable with respect to the crank-pin. The outer end of the tube 43 is formed with a non-circular head 46 as shown on the left-hand side of Figure 3. The tube is screwed in by engaging the head 46 with a suitable tool and the application of torque is continued until the head 46 is sheared off from the remainder of the tube. The head is grooved as shown at 146 in Figure 3 to ensure that it shears at this point. The rough outer end of the tube is then machined down to a surface, as shown in Figure 2, or as shown in Figure 3, which is countersunk with respect to the layer 44 of bearing metal. In addition, or alternatively, the tube may be fastened by a riveting, peening or like operation. The tube 43 has a shoulder 47 to engage a flat 49 on the external surface of the crank-pin. The outer part 48 of the tube therefore constitutes a dowel to locate the bearing bush positively against movement with respect to the crank-pin.

Preferably, two locking tubes 43 are employed as shown in Figure 3, each being engaged by a nut 45.

As has already been explained, the pressure-sector on the crank-pin of a radial-cylinder engine extends approximately over a quadrant measured from the point nearest the crank-shaft axis in the direction in which the crank-pin rotates with respect to the big-end. In the engine described with reference to Figures 1 and 2 it is assumed that the crank-shaft rotates in a clockwise direction as seen in Figure 2. That is to say, the pressure-sector lies along the surface of the bearing metal 44 enclosed by the two radial planes indicated as A—X, A—X in Figures 2 and 4. According to the invention, the external surface of the bearing bush is formed with depressions over a region, approximately opposite to the pressure-sector, lying between two radial planes indicated as B—X, B—X, shown in Figures 2 and 4. The lines B—B are also shown in Figure 5. The surface of the bearing bush between the two cylindrical generators B—B, B—B, is formed with an approximately rectangular network comprising grooves 50, 51, 52, 53, running longitudinally of the bush and narrower grooves 54, 55, 56, 57, 58, running circumferentially of the bush. As shown in Figures 3 and 4, the grooves completely penetrate the bearing metal 44 so that at the base of each groove the steel of the shell 19 is exposed. Into the longitudinal groove 50 the open ends of the locking tubes 43 emerge, each tube constituting a conduit by which oil is led from the central crank-pin bore 42 into the network of grooves described. It will be seen that the tubes 43 emerge approximately at the leading edge of the groove-network, that is to say, the edge which first encounters that part of the big-end bore which has just left the pressure-sector A—A.

It will be seen that the grooves 50, 51, 52, 53, 54, 55, 56, 57 and 58 provide a considerable effective cross-section through which a large quantity of oil can flow. Reference to Figure 2 will show that that portion of the big-end bore which is approaching the loaded pressure-sector A—A is previously cooled by passing over the grooved sector B—B, it being borne in mind that the big-end boss 20 is rotating in a counter-clockwise direction in Figure 2 with respect to the bearing bush. The big-end boss also wipes around with it a supply of cool oil from the sector B—B to lubricate the loaded pressure-sector A—A. The excess oil is discharged from the ends of the big-end bearing in the manner already described with reference to Figure 1.

When the bearing bush 19, 44, needs to be replaced owing to wear on the bearing metal, the dowel-portions 48 of the tubes 43 are destroyed by a machining operation and the interference fit is destroyed by machining or chiseling a slot lengthwise along the shell.

Figures 1 and 2 show a crank-shaft of the kind in which the crank-pin is separate from both crank-webs. In the alternative arrangement shown in Figures 6 and 7, the crank-pin 14 is formed integrally with one crank-web 12 and is clamped to the other crank-web 13. The crank-shaft 11 is formed with conduits 39, 40, 41, leading to a central conduit 42 in the crank-pin as before. The master-rod boss 20, flanges 22, 23, wrist-pins 24 and auxiliary rods 26 are arranged in the same manner as in Figures 1 and 2. The bearing bush comprises a steel shell 19 the outer surface of which has welded or otherwise affixed to it a thin layer of bearing metal in the manner already described. The part of the bearing bush which is engaged by the bore of the big-end boss 20 may be substantially identical with the bush above described with reference to Figures 3 to 5. But alternative arrangements for locating the bush on the crank-pin, are used, as will now be described.

At one end, the shell 19 is formed integrally with an outwardly-directed flange 59 which, as shown in Figure 7, is cut all around with splines or castellations 60 which co-operate with internal splines or castellations 61 on a locking ring 62 which encircles the crank-pin. The locking ring is itself keyed against rotation with respect to the crank-pin by being formed with a longitudinally-extending tongue 63 which rests in a groove in an integrally formed rib 64 carried by the web 12. The ring 62 is thus locked against rotation with respect to the crank-pin by the interengagement of the tongue 63 with the rib 64 and the bearing bush is locked by the castellations against rotation with respect to the locking ring.

It is thus not necessary to provide tubular bolts similar to the tubes 43 of Figures 1 to 5. The oil is conducted from the central conduit 42 to the bearing along one or more unlined radial conduits 65 in the crank-pin, each of which conduits opens in a hole 66 in the shell 19. There may be one, two, or more conduits 65 and each emerges from the steel shell along the leading edge of the grooved network in the manner already explained with reference to Figure 5.

It will be seen that the locking means 59, 64, cannot restrain the bearing bush against endwise movement along the crank-pin. Such endwise movement is prevented by the abutment of the flange 59 against the crank-web 12 at one end and by the insertion of a shim 67 between the other end of the bush and the adjacent face of the crank-web 13, the thickness of the shim being preselected so as to take up any clearance at this end.

In the arrangement illustrated in Figures 6 and 7 the interference fit between the bearing shell 19 and the crank-pin 14 is such that the shell can be removed by means of a tool which is engaged with the holes 66 and with two similar holes, one of which, 166 is shown in Figure 7. For example, with a crank-pin of about 2¾" diameter, an interference fit of from 0.0005 or less to 0.002 inch may be used.

In an alternative arrangement shown in Figure 8, the bush 19 may be locked against rotation by being formed with a lug 119 which projects between the two horns of the crank-web 13.

In the example hereinbefore described, the bearing bush comprises a steel shell to the outer surface of which is united a thin layer of bearing metal. However, in an alternative form of the invention illustrated in Figure 9, the bearing bush 19 may be composed wholly of bearing metal alone such as phosphor-bronze or an aluminium bearing alloy.

The invention may also be applied to crank-shaft or other journal-bearings where the construction is such that a unitary shell may be passed along the shaft on to the journal.

I claim:

1. A journal-bearing, of the kind which has a pressure-sector, comprising a steel shell fixed to the journal, a thin outer layer of bearing metal fixed to said shell and formed with an external depression at a point in its circumference other than within the pressure-sector, and means for supplying lubricant to such depression.

2. A journal-bearing, of the kind which has a pressure-sector, comprising a hollow journal, a bearing bush fastened to the journal so as to rotate therewith, a network of grooves extending over a part of the circumference of the bearing bush not occupied by the pressure-sector, and a radial conduit from the hollow interior of the journal to a point near the leading edge of the pressure-sector.

3. A journal bearing for the big-end of the connecting-rod of a radial-cylinder internal-combustion engine, comprising a crank-pin, a unitary bush engaging the crank-pin by an interference fit, said bush having at least an outer layer of bearing metal, a recess in said bearing metal outside the pressure sector of the crank-pin, and means for supplying lubricant to said recess.

4. A journal bearing of the kind which has a pressure-sector, comprising a bush composed wholly of bearing metal engaging the journal by an interference fit, means in addition to said interference fit for locating the bush with respect to the journal, a recess in the outer surface of said bush outside the pressure-sector of the journal and means for supplying lubricant to said recess.

5. A journal bearing for the big-end of the connecting-rod of a radial-cylinder internal-combustion engine, comprising a crank-pin, a bearing bush engaging said crank-pin by an interference fit, means in addition to said interference fit for locating the bush non-rotatably on the crank-pin, a depression on the outer surface of said bush outside the pressure sector of the crank-pin and means for supplying lubricant to said depression.

6. A journal bearing of the kind which has a pressure sector, comprising a hollow journal, a unitary bearing bush engaging said journal, a dowel extending radially through said journal and bush and having a shoulder to engage the external surface of the journal, a nut inside the journal engaging the inner end of said dowel, a head on said dowel frangibly connected thereto, a bearing metal surface on the outside of said unitary bush, a depression in said bearing metal outside the pressure sector and means for supplying lubricant to said depression.

7. A journal bearing for the big-end of the connecting-rod of a radial-cylinder internal-combustion engine, comprising a crank-pin, a bearing bush having an outer surface of bearing metal engaging said crank-pin by an interference fit, inter-engaging projections on said bush and said crank-pin structure for locating said bush against rotation on said crank-pin, a bearing metal surface on the outside of said bush, a recess in said bearing metal surface situated other than within the pressure sector of said crank-pin and means for supplying lubricant to said recess.

8. In a radial-cylinder internal-combustion engine, the combination of a crank-shaft, a split crank-web thereon forming horns, a crank-pin gripped by said horns, a unitary bearing bush engaging said crank-pin, an integral projection carried by said bush lying between said horns to lock the bush against rotation on the crank-pin, a layer of bearing metal carried on the outside of said bush, a recess formed in said bearing metal outside the pressure sector of said crank-pin and means for supplying lubricant to said recess.

ALFRED HUBERT ROY FEDDEN.